(12) United States Patent
Backlund

(10) Patent No.: US 12,194,534 B2
(45) Date of Patent: Jan. 14, 2025

(54) METHOD FOR CONTROLLING AN ENERGY BEAM

(71) Applicant: Arcam AB, Mölnlycke (SE)

(72) Inventor: Johan Backlund, Onsala (SE)

(73) Assignee: Arcam AB, Mölnlycke (SE)

( * ) Notice: Subject to any disclaimer, the term of this patent is extended or adjusted under 35 U.S.C. 154(b) by 608 days.

(21) Appl. No.: 17/292,278

(22) PCT Filed: Feb. 28, 2019

(86) PCT No.: PCT/EP2019/055062
§ 371 (c)(1),
(2) Date: May 7, 2021

(87) PCT Pub. No.: WO2020/094261
PCT Pub. Date: May 14, 2020

(65) Prior Publication Data
US 2021/0402479 A1 Dec. 30, 2021

Related U.S. Application Data

(60) Provisional application No. 62/758,045, filed on Nov. 9, 2018.

(51) Int. Cl.
*B33Y 50/02* (2015.01)
*B22F 10/28* (2021.01)
(Continued)

(52) U.S. Cl.
CPC .............. *B22F 10/85* (2021.01); *B22F 10/28* (2021.01); *B22F 10/80* (2021.01); *B22F 12/41* (2021.01);
(Continued)

(58) Field of Classification Search
CPC ........ B22F 10/28; B22F 10/362; B22F 10/80; B22F 10/85; B22F 12/41; B22F 12/90;
(Continued)

(56) References Cited

U.S. PATENT DOCUMENTS

2006/0038125 A1* 2/2006 Tsuneta .................. G01N 23/22
250/310
2016/0211119 A1* 7/2016 Lock ....................... B33Y 10/00
(Continued)

FOREIGN PATENT DOCUMENTS

| EP | 2832473 A1 | 2/2015 | |
|---|---|---|---|
| WO | WO-2016116363 A1 * | 7/2016 | .............. B22F 10/00 |
| WO | 2017015115 A1 | 1/2017 | |

OTHER PUBLICATIONS

International Search Report and Written Opinion for application PCT/EP2019/055062 mail date Sep. 12, 2019 (13 pages).

*Primary Examiner* — Yuhui R Pan
(74) *Attorney, Agent, or Firm* — Dinsmore & Shohl LLP

(57) ABSTRACT

A method for controlling an energy beam in an additive manufacturing machine when forming a three-dimensional article layer by layer by successive fusion of selected areas of powder layers, which selected areas correspond to successive layers of the article. The method includes steps of radiating a powder layer by the energy beam and creating a set of images of the powder layer for a set of positions on the powder layer by detecting particles emitted, backscattered or reflected from the powder layer when being radiated, comparing data representing the set of images and reference data with each other for identifying a difference between the energy beam when used on the powder layer and the reference data, with respect to at least one energy beam parameter, and adjusting the energy beam based on such an identified difference between the energy beam when used on the powder layer and the reference data.

19 Claims, 10 Drawing Sheets

(51) Int. Cl.
*B22F 10/80* (2021.01)
*B22F 10/85* (2021.01)
*B22F 12/41* (2021.01)
*B22F 12/90* (2021.01)
*B33Y 10/00* (2015.01)
*B33Y 30/00* (2015.01)
*B33Y 40/10* (2020.01)
B22F 10/362 (2021.01)

(52) U.S. Cl.
CPC ............. *B22F 12/90* (2021.01); *B33Y 10/00* (2014.12); *B33Y 30/00* (2014.12); *B33Y 40/10* (2020.01); *B33Y 50/02* (2014.12); *B22F 10/362* (2021.01)

(58) Field of Classification Search
CPC ............ B23K 15/0013; B23K 15/0086; B23K 26/032; B23K 26/342; B23K 31/125; B33Y 10/00; B33Y 30/00; B33Y 40/10; B33Y 50/02; Y02P 10/25
See application file for complete search history.

(56) References Cited

U.S. PATENT DOCUMENTS

| | | |
|---|---|---|
| 2018/0126670 A1 | 5/2018 | DehghanNiri et al. |
| 2019/0283169 A1* | 9/2019 | Lobastov ........... B23K 15/0013 |

* cited by examiner

METHOD FOR CONTROLLING AN ENERGY BEAM

CROSS REFERENCE TO RELATED APPLICATIONS

This application is a U.S. national phase of International Application No. PCT/EP2019/055062, filed Feb. 28, 2019, which claims priority to and the benefit of U.S. Provisional Patent Application No. 62/758,045, filed on Nov. 9, 2018, the contents of which as are hereby incorporated by reference in their entirety.

BACKGROUND

Related Field

The application relates to a method for controlling an energy beam in an additive manufacturing machine when forming a three-dimensional article layer by layer by successive fusion of selected areas of powder layers, which selected areas correspond to successive layers of the three-dimensional article. In addition, the application relates to a control unit for controlling an energy beam.

Description of Related Art

Freeform fabrication or additive manufacturing (AM) using electron beam melting (EBM) or laser beam melting is a method for forming a solid three-dimensional article from a powder. The three-dimensional article is formed layer by layer by successive fusion of selected areas of powder layers, which selected areas correspond to successive layers of the three-dimensional article. A layer of powder, such as metal powder, is deposited on a build area and an electron beam or a laser beam is used to selectively melt the powder layer of the build area. The melted material fuses with underlaying layers and solidifies to form the top layer of the solid three-dimensional article. A further layer of powder is deposited onto the previous layer, and the electron or laser beam is used to selectively melt the further powder layer of the build area. The melted material solidifies and form another solid layer fused onto the previous solid layer. This process is repeated for multiple layers until the desired 3D geometry of the article is achieved.

An apparatus for forming such a three-dimensional article has a build table on which the three-dimensional article is to be formed, a powder distributor device for delivering powder to the build table (build area) for the formation of the powder layers and an electron beam source or a laser beam source for providing the energy beam used for melting the powder. Further, a control unit is used for controlling the energy beam to melt the selected areas of the powder layers.

In an EBM-system where a cathode is used as electron beam source, the EBM-system is calibrated after replacement of the cathode. During manufacturing, the characteristics of the electron beam can however change due to drift in the calibration or events during the manufacturing involving contamination or discharging which events age the cathode and have an impact on the emission of electrons from the cathode. An energy beam deviation as compared to the energy beam status at the calibration time may under unfavorable conditions result in a less efficient manufacturing process or an impaired quality of the final product.

SUMMARY

An objective is to provide a method for controlling an energy beam, by which method the quality of the energy beam can be maintained for an increased period of time.

The objective is achieved by a method for controlling an energy beam in an additive manufacturing machine when forming a three-dimensional article layer by layer by successive fusion of selected areas of powder layers, which selected areas correspond to successive layers of the three-dimensional article, wherein the method comprises the steps of radiating a powder layer by the energy beam and creating a set of images of the powder layer for a set of positions on the powder layer by detecting particles emitted, backscattered or reflected from the powder layer when being radiated, and comparing data representing the set of images and reference data with each other for identifying a difference between the energy beam when used on the powder layer and the reference data, with respect to at least one energy beam parameter, and the step of adjusting the energy beam based on such an identified difference between the energy beam when used on the powder layer and the reference data.

The application is based on the insight that the powder used in additive manufacturing has a favourable particle size distribution and particle shape for identifying changes in energy beam parameters, such as spot size and spot shape of the energy beam. The statistical distribution of the particle size and shape of the powder gives different powder layers (of the same material) same characteristics, making it possible to evaluate the energy beam quality even though evaluation of the energy beam is performed for different powder layers.

Although the present disclosure is mainly exemplified by radiating with an electron beam, the disclosure can be applied for other types of energy beam, such as a laser beam. Adjustment of an electron beam can be made by controlling deflection, stigmator and/or focus amplifiers and corresponding coils of an electron beam source, whereas adjustment of a laser beam can be made by controlling focus lenses, stigmator lenses and/or deflection mirrors of a laser beam source.

The expression "images" is meant to cover both pictures visible to the eye and gathered data representing images in an image processing system, which images are not necessarily visible to the eye.

By the expression "a set of" with respect to "images" or "positions" is meant one or more, and in some embodiments two or more images or positions. Often the number of positions is in the interval 1-10, and at least one image is created for each position.

Further, for detecting the particles a particle detector device can be selected and adapted to the particles to be detected which in turn depends on the energy beam used and the current analysis. The particles emitted, backscattered or reflected from the radiated powder layer which are to be detected, can be for example one or more of back-scattered electrons originating from the electron beam, secondary electrons emitted from the material of the powder layer, Auger electrons, reflected or backscattered photons from the laser beam, emitted photons, x-rays, etc. Thus, the term "particle" is here used for covering massless particles too, such as photons or in other words electromagnetic radiation.

According to one embodiment, the method comprises the step of creating the data representing the set of images by means of frequency analysis applied on the set of images, and in some embodiments, using Fourier analysis in the frequency analysis. Hereby, the spot size and shape of the energy beam can be obtained from a frequency spectrum resulting from the analysis.

According to another embodiment, the method comprises the step of radiating a reference powder layer by the energy beam and creating a set of reference images of the reference powder layer for a set of positions on the reference powder layer by detecting particles emitted, backscattered or reflected from the reference powder layer when being radiated, where the reference data represents the set of reference images. Hereby, reference data relevant for the energy beam for the current machine conditions and the powder used can be achieved. Such a set of reference images is thus created before a subsequent set of images of the powder layer is created to be compared with the reference images.

According to a further embodiment, the method comprises the step of selecting the set of positions on the powder layer and the set of positions on the reference powder layer such that they have same coordinates in a coordinate system of the machine. By using same positions, the evaluation of the energy beam quality can be facilitated. If for example the energy beam characteristics are dependent on the energy beam spot position, such position dependency can be handled easier when comparing images for different powder layers for same positions.

According to a further embodiment, the method comprises the step of adjusting the energy beam based on an identified difference of the spot size of the energy beam between the energy beam when used on the powder layer and the reference data. Hereby, the spot size of the energy beam can be adjusted for maintaining the spot size within a predetermined interval. For example, the spot size can be the diameter of the energy beam at the surface of the current powder layer. The surface of the powder is suitably used as reference in the vertical direction (Z-direction) for evaluating the spot size in the XY-plane. For an electron beam, such an adjustment can be performed by controlling focus amplifiers and coils.

According to a further embodiment, the method comprises the step of adjusting the energy beam based on an identified difference of the spot shape of the energy beam between the energy beam when used on the powder layer and the reference data. Hereby, the spot shape of the energy beam can be adjusted for maintaining the spot shape within a predetermined interval. For example, the spot shape can be defined by the roundness of the energy beam at the surface of the current powder layer. The surface of the powder is suitably used as reference in the vertical direction (Z-direction) for evaluating the spot shape in the XY-plane. For an electron beam, such an adjustment can be performed by controlling stigmator amplifiers and coils.

Although a spot size or a spot shape deviation is suitably corrected by adjusting the energy beam as described hereinabove, such that the spot size or spot shape is changed back to a value close to the value present immediately after a calibration of the energy beam for instance, other adjustments of the energy beam for compensating for a spot size or spot shape deviation could also be used. For example, when using an electron beam the heating of the cathode can also be adjusted, which effects the emission of electrons and also the size of the electron beam. The temperature of the cathode may be adjusted such that the emission of electrons is substantially constant during the life of the cathode.

According to a further embodiment, the method comprises the step of comparing the data representing the set of images and the reference data with each other with respect to focus. Hereby, the spot size of the energy beam can be evaluated.

According to a further embodiment, the method comprises the step of comparing the data representing the set of images and the reference data with each other with respect to astigmatism. Hereby, the spot shape of the energy beam can be evaluated.

According to a further embodiment, the method comprises the step of creating the set of reference images after calibration of the energy beam has been performed, and in some embodiments, creating the set of reference images before starting to melt the powder for forming the three-dimensional article. Hereby, reliable reference data of the energy beam parameters such as spot size and spot shape can be achieved for use later on during the manufacturing process of the three-dimensional article. The set of reference images may be created immediately or close after calibration of the energy beam.

According to a further embodiment, the method comprises the step of creating the set of images while moving the energy beam for pre-heating the powder layer. Hereby, no additional time is required for creating the images, since it can be performed in-situ during the normal manufacturing process.

Further, the energy beam can often be scanned at different speeds, and thereby images can be created also for different and higher beam power (higher beam currents for an electron beam) used in the melt process, without melting the powder layer during these steps for adjustment of the energy beam before melting of the powder layer. Same procedures can be applied when creating a set of reference images.

In order to improve accuracy, scanning for creating the images can be repeated multiple times and averaging can be used. Hereby, the signal-to-noise ratio and thus the image quality can be increased. This in turn leads to improved determination of the spot size and the spot shape of the energy beam.

According to a further embodiment, the method comprises the step of creating the set of images after raking of the powder layer. Hereby, an even surface of the powder layer situated at a predetermined level in the machine can be used for creating the images. Same procedure can be applied when creating a set of reference images.

According to another aspect of the disclosure, a further objective is to provide a control unit for controlling an energy beam in an additive manufacturing machine, by which control unit the quality of the energy beam can be maintained for an increased period of time.

This objective is achieved by a control unit for controlling an energy beam in an additive manufacturing machine, where a powder layer is radiated by the energy beam and a set of images of the powder layer is created for a set of positions on the powder layer by detecting particles emitted, backscattered or reflected from the powder layer when being radiated, wherein the control unit is configured to compare data representing the set of images and reference data with each other for identifying a difference between the energy beam when used on the powder layer and the reference data, with respect to at least one energy beam parameter, and configured to adjust the energy beam based on such an identified difference between the energy beam when used on the powder layer and the reference data.

The adjustment of an electron beam can be made by controlling deflection, stigmator and/or focus amplifiers and corresponding coils of an electron beam source, or controlling focus lenses, stigmator lenses and/or deflection mirrors of a laser beam source.

In addition, the disclosure relates to an arrangement for an additive manufacturing machine comprising such a control unit and a particle detector device, and to a computer program comprising program code means for performing a method according to the disclosure.

The advantages of the control unit, the arrangement for an additive manufacturing machine and the computer program are similar to the advantages already discussed hereinabove with reference to the different embodiments of the method.

Further advantages and advantageous features of the application are disclosed in the following description and in the claims.

BRIEF DESCRIPTION OF THE DRAWINGS

With reference to the appended drawings, below follows a more detailed description of embodiments of the application cited as examples.

In the drawings.

DETAILED DESCRIPTION OF EXAMPLE EMBODIMENTS

Various embodiments of the present disclosure will now be described more fully hereinafter with reference to the accompanying drawings, in which some, but not all embodiments of the disclosure are shown. Indeed, embodiments of the disclosure may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the disclosure relates. The term "or" is used herein in both the alternative and conjunctive sense, unless otherwise indicated. Like numbers refer to like elements throughout.

Still further, to facilitate the understanding of this disclosure, a number of terms are defined below. Terms defined herein have meanings as commonly understood by a person of ordinary skill in the areas relevant to the present disclosure. Terms such as "a", "an" and "the" are not intended to refer to only a singular entity, but include the general class of which a specific example may be used for illustration. The terminology herein is used to describe specific embodiments of the disclosure, but their usage does not delimit the disclosure, except as outlined in the claims.

The term "three-dimensional structures" and the like as used herein refer generally to intended or actually fabricated three-dimensional configurations (e.g., of structural material or materials) that are intended to be used for a particular purpose. Such structures, etc. may, for example, be designed with the aid of a three-dimensional CAD system.

The term "electron beam" as used herein in various embodiments refers to any charged particle beam. The sources of charged particle beam can include an electron gun, a linear accelerator and so on.

Figure 1:
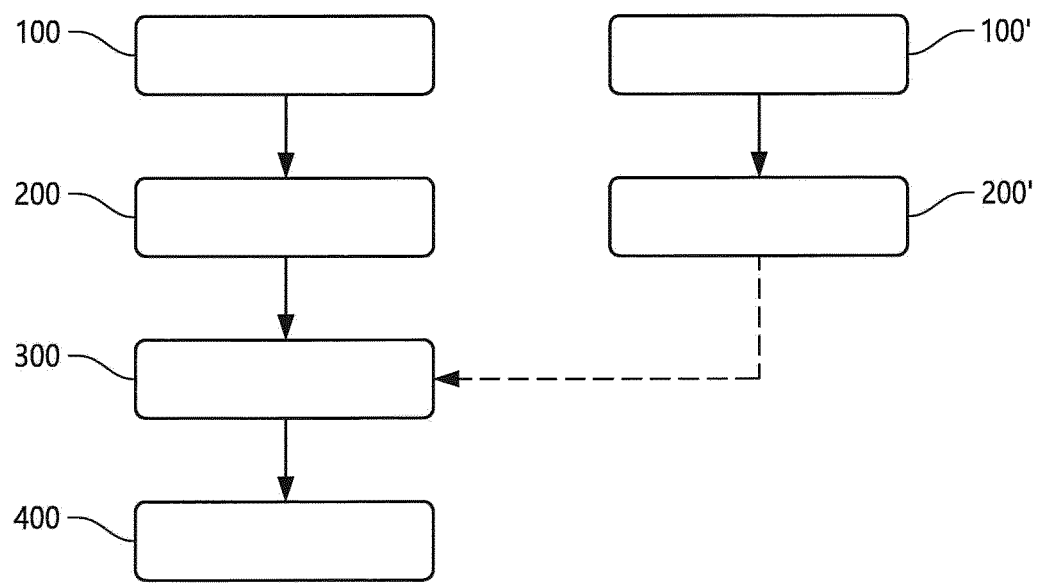
FIG. 1 is a flow chart for illustrating a method for controlling an energy beam.

FIG. 1 shows a flow chart schematically illustrating one example embodiment of a method for controlling an energy beam.

The method described hereinafter is performed in an additive manufacturing (AM) machine. Thus, the method is implemented when forming a three-dimensional article layer by layer by successive fusion of selected areas of powder layers, which selected areas correspond to successive layers of the three-dimensional article. The equipment for melting the powder can be any suitable device for transferring energy by means of an energy beam to the selected areas, such as an electron beam source or laser beam source.

The method for controlling an energy beam comprises the step 100 of radiating a powder layer by the energy beam and the step 200 of creating a set of images of the powder layer for a set of positions on the powder layer by detecting particles emitted, backscattered or reflected from the powder layer when being radiated. Further, the method comprises the step 300 of comparing data representing the set of images and reference data with each other for identifying a difference between the energy beam when used on the powder layer and the reference data, with respect to at least one energy beam parameter, and the step 400 of adjusting the energy beam based on such an identified difference between the energy beam when used on the powder layer and the reference data.

It should be stressed that such radiation by the energy beam is performed with a relatively low energy beam power and/or a relatively high scanning speed of the energy beam along the powder layer surface for avoiding the powder to be melted. As soon as the energy beam quality has been verified by the method, the energy beam power can be adapted to a subsequent melting procedure. By using a high scanning speed, a relatively high power level utilized in the subsequent melting procedure can be used for creating the images. The set of images can be created while moving the energy beam for pre-heating the powder layer, and in some embodiments, the set of images is created after raking of the powder layer. After raking is here meant after that a new powder layer has been formed and prepared for a subsequent melting of selected areas of the powder layer.

In the example embodiment schematically illustrated in FIG. 1, the method also comprises the step 100' of radiating a reference powder layer by the energy beam and the step 200' of creating a set of reference images of the reference powder layer for a set of positions on the reference powder layer by detecting particles emitted, backscattered or reflected from the reference powder layer when being radiated. This set of reference images is then used in the comparing step 300 or in other words; the reference data used in the comparing step 300 represents the set of reference images created in the reference image creating step 200'.

This means that the radiating step 100' and the reference image creating step 200' are suitably performed initially when the energy beam is assumed to have a sufficient quality, and the radiating step 100, image creating step 200, comparing step 300 and the adjusting step 400 are performed later on when it can be assumed that the energy beam quality may have been deteriorated.

For example, the set of reference images is created after, and in some embodiments, immediately after calibration of the energy beam has been performed, and before starting to melt the powder for forming the three-dimensional article. The set of reference images can be created after raking of the reference powder layer while moving the energy beam for pre-heating the reference powder layer.

It should be stressed that the reference powder layer can be a powder layer to be used for forming the three-dimensional article.

The reference images can provide information about energy beam parameters for the current energy beam, such as the energy beam spot size and energy beam spot shape, to be used as set-point values when adjusting the energy beam.

When reference images are used, the method may comprise the step of selecting the set of positions on the powder layer and the set of positions on the reference powder layer such that they have same coordinates in a coordinate system of the AM machine.

In another example embodiment of the method, another reference data could be used. For example, instead of creating reference images, set-point values could be selected for the energy beam spot size and/or energy beam spot shape based on the material of the powder, the powder fraction distribution, the desired resolution in the melting procedure, etc.

The method can comprise the step of comparing the data representing the set of images and the reference data with each other with respect to focus. Since focus in the images and the energy beam spot size have a derivable relationship, one way of controlling the focus of the energy beam is adjustment of the energy beam spot size. The method is suitably repeated or iterated for continuously correct for any spot size deviation and adjust the spot size towards the set-value. For example, the spot diameter of the energy beam can be determined from a frequency spectrum resulting from frequency analysis of the images and be compared with reference data.

The method can comprise the step of comparing the data representing the set of images and the reference data with each other with respect to astigmatism. Since astigmatism in the images and the energy beam spot shape have a derivable relationship, one way of controlling the energy beam is adjustment of the energy beam spot shape. The method is suitably repeated or iterated for continuously correct for any spot shape deviation and adjust the spot shape towards the set-value. For example, the spot shape of the energy beam can be determined from a frequency spectrum resulting from frequency analysis of the images and be compared with reference data. In this case the roundness or ellipticity of the energy beam spot is determined.

Thus, by the method an automatic focusing and/or astigmatism correction function can be obtained for continuously improve or maintain the quality of the energy beam.

Figure 2:
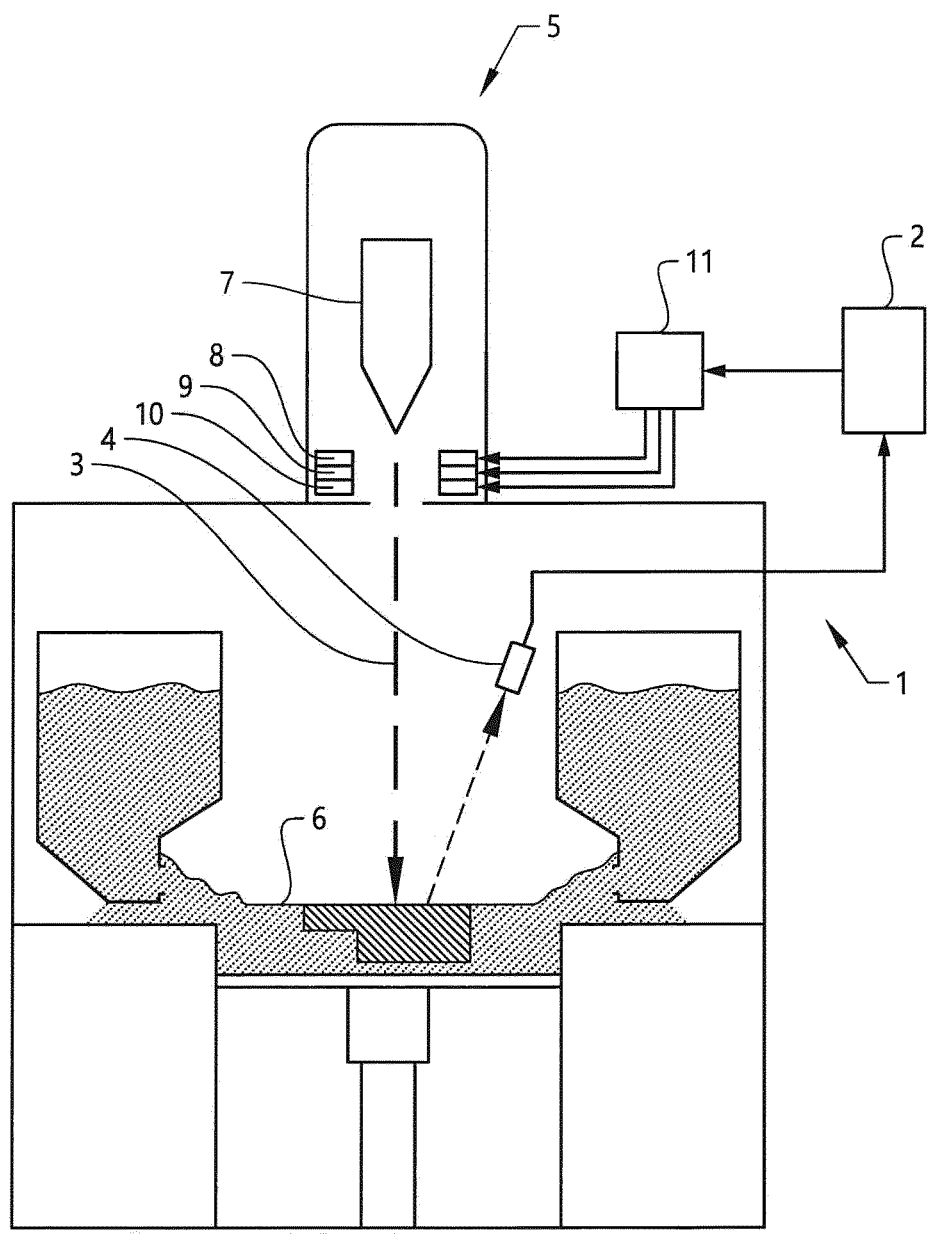
FIG. 2 is a schematic view of an AM machine using an electron beam.

In FIG. 2 an arrangement 1 for an AM machine is schematically illustrated. The arrangement 1 comprises a control unit 2 for controlling an electron beam 3, and a particle detector device 4. Further, an electron beam source 5 for providing the electron beam 3 is schematically illustrated. A powder layer 6 is radiated by the electron beam 3 and a set of images of the powder layer 6 is created for a set of positions on the powder layer by detecting particles from the radiated powder layer 6 by the particle detector device 4. The detected particles can be emitted or back-scattered electrons, x-rays or photons as previously described hereinabove.

The control unit 2 is configured to compare data representing the set of images and reference data with each other for identifying a difference between the electron beam 3 when used on the powder layer 6 and the reference data, with respect to at least one electron beam parameter, and to adjust the electron beam 3 based on such an identified difference between the electron beam 3 when used on the powder layer 6 and the reference data.

The electron beam source 5 can be designed in a way well known to the person skilled in the art. The electron beam source 5 may have an electron gun 7 with an emitter electrode which is connected to a high voltage circuit and a current source for accelerating electrons and releasing electrons from the emitter electrode. These electrons form the electron beam 3. The electron beam source 7 has also focus coils 8, stigmator coils 9 and deflection coils 10 for focusing and directing the electron beam 3 on various positions of the powder layer surface. The electron beam source 5 has further focus amplifiers, stigmator amplifiers and deflection amplifiers 11 connected to the focus coils 8, stigmator coils 9 and the deflection coils 10, respectively.

The coils 8, 9, 10 and the amplifiers (shown as one component) 11 are schematically illustrated in FIG. 2. The control unit 2 controls the electron beam 3 by transmitting signals to the coils 8, 9, 10 via the amplifiers 11. Hereby, the electron beam 3 can be adjusted.

The detected particles can be for example back-scattered electrons originating from the electron beam source or secondary electrons emitted from the material of the powder layer. The particle detector device 4 may use any suitable equipment for detecting electrons. For example, the particle detector device 4 can have an additional bias voltage for selective detection of the electrons. The particle detector device can generate data signals to be transmitted to the control unit. The data can be further processed and utilized for creating images for comparing with the reference data.

It would also be possible to use a photon detector device, since photons can be emitted from the powder layer as a physical reaction to the target materials intrinsic interaction with the absorbed energy from the electron beam. In such a case, a photon detector device may use any suitable equipment, such as for example photodiode, phototransistor, CCD, CMOS, PMT or similar.

The control unit 2 may comprise one or more microprocessors and/or one or more memory devices or any other components for executing computer programs to perform the method. The control unit may comprise an image processing unit, which may include a frequency analysis calculation unit. Thus, the control unit may be provided with a computer program for performing all steps of any embodiment of the method described hereinabove. The control unit can be a separate component or be integrated in another controller.

In addition to control the equipment for focus, astigmatism and deflection, the control unit can be arranged to control one or more parameters of the energy beam source, such as the energy beam current, the energy beam power, the temperature of the cathode, etc. The control unit can be part of a controller used also for other functions of the AM machine, such as movement of the build table, control of a powder distribution device, etc.

The arrangement 1 for an AM machine and the control unit 2 itself can be combined with any of the features disclosed hereinabove, for example discussed with reference to the method and/or related to the AM machine.

Figure 3:
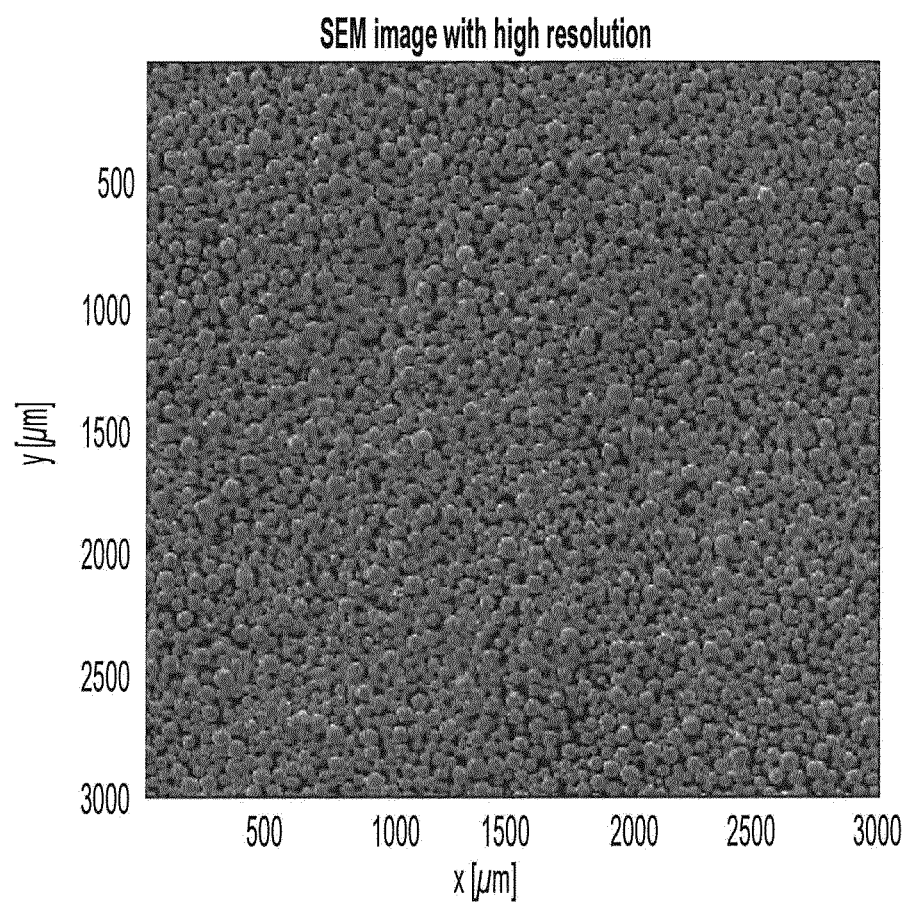
FIG. 3 is a SEM-image of a powder layer surface.
Figure 4A:
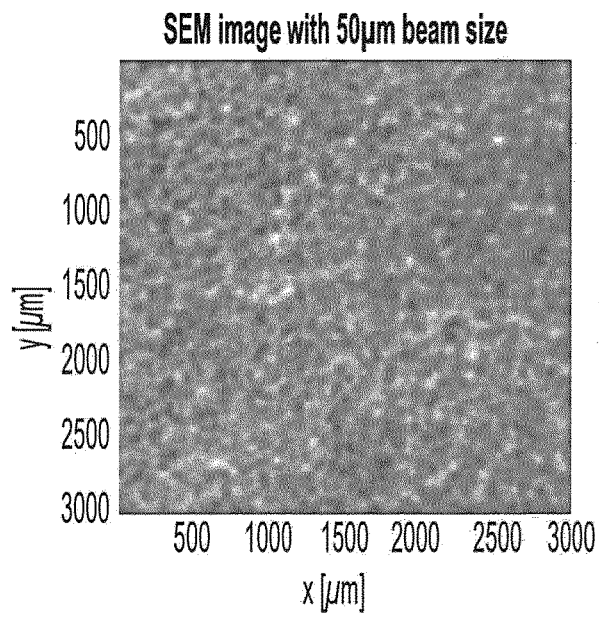
FIGS. 4A, 4B and 4C show SEM-images of the powder layer surface in FIG. 3 for different electron beams.
Figure 4B:
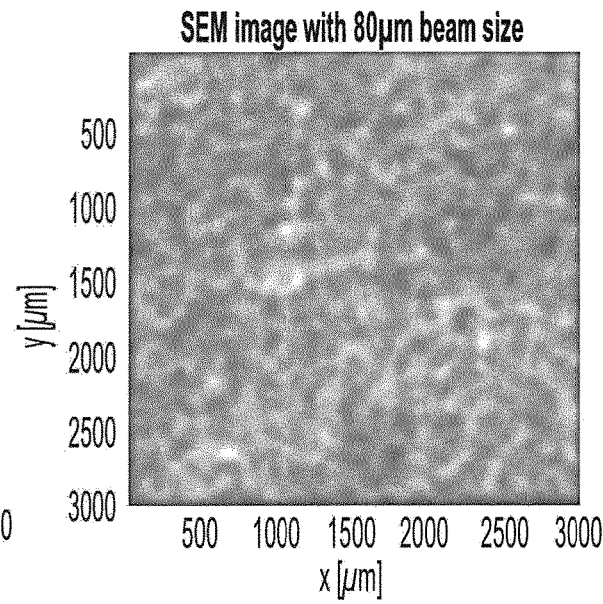
Figure 4C:
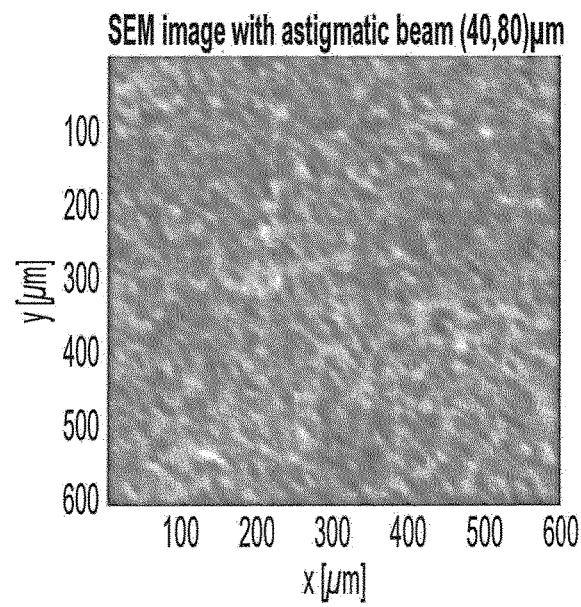

FIG. 3 shows an example of an SEM-image of a powder layer surface with high resolution making the powder particulates visible, and FIGS. 4A, 4B and 4C show SEM-images of the same powder layer surface created with different electron beams.

In FIG. 4A, a Gaussian beam with FWHM 50 µm is used. In FIG. 4B, a Gaussian beam with FWHM 80 µm is used and in FIG. 4C, a Gaussian beam in 2D with FWHM 40 µm and 80 µm is used.

Figure 3A:
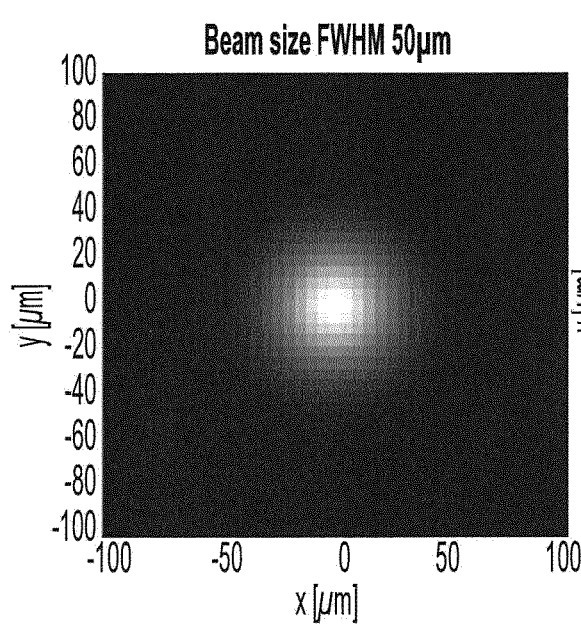
FIGS. 3A, 3B and 3C show different electron beam sizes.
Figure 3B:
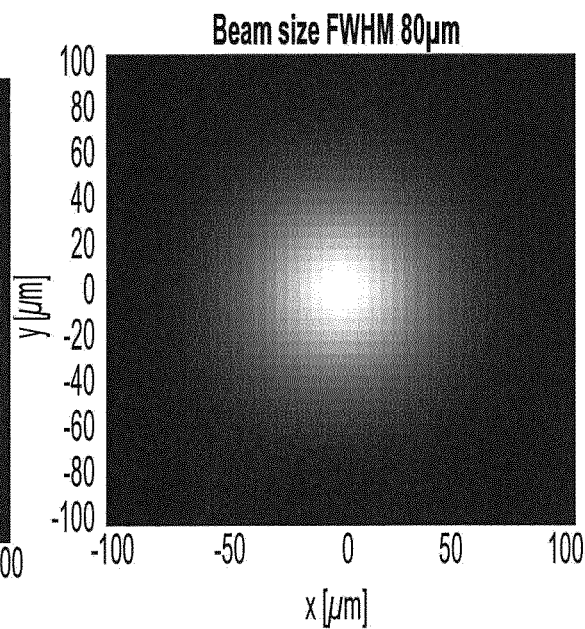
Figure 3C:
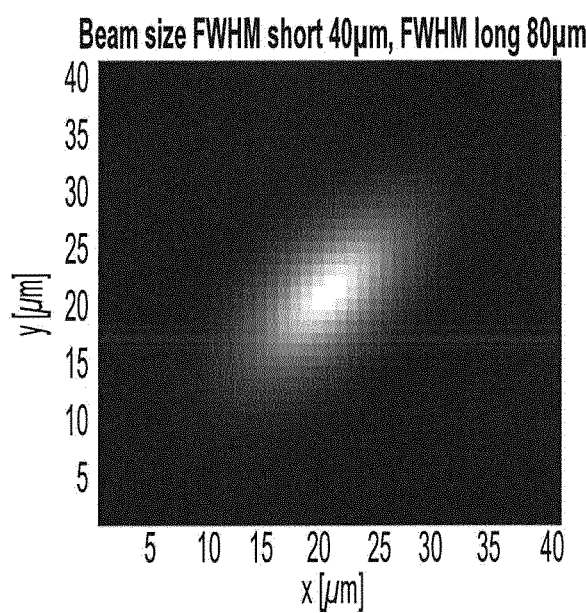

These Gaussian electron beams are shown in FIGS. 3A, 3B and 3C.

Figure 5A:
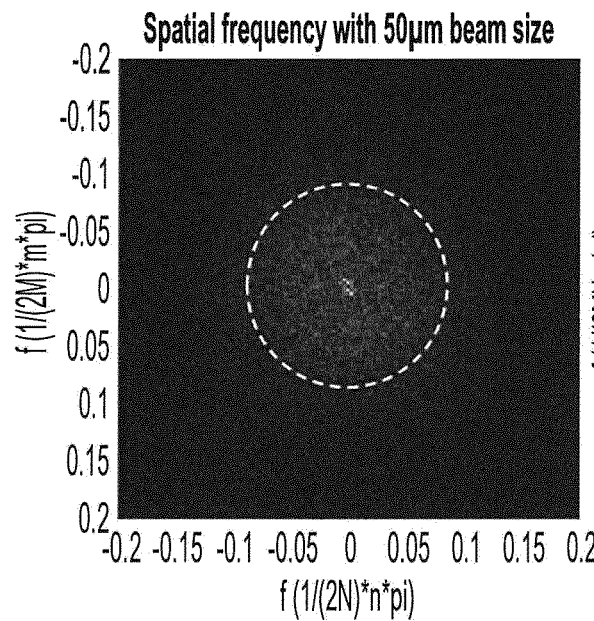
FIGS. 5A, 5B and 5C show spatial frequency spectrums resulting from FFT of the SEM-images in FIGS. 4A, 4B and 4C.
Figure 5B:
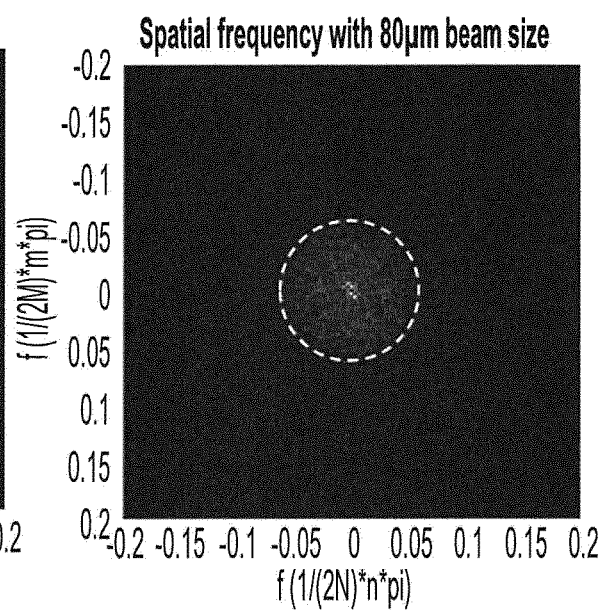
Figure 5C:
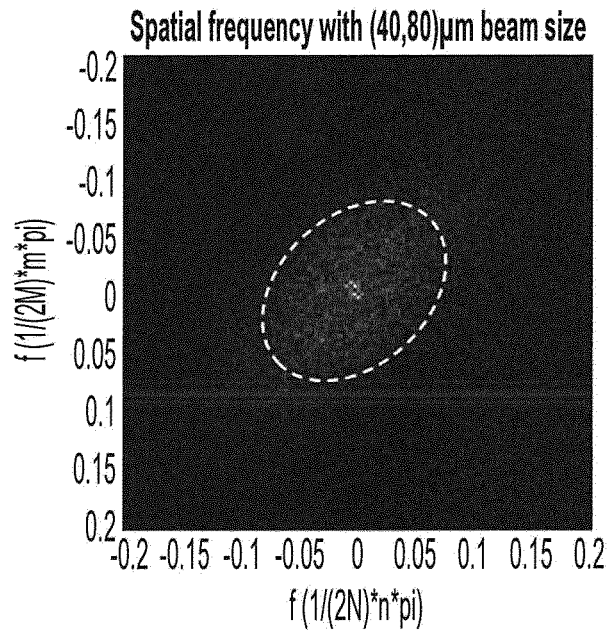

For creating the data representing the SEM-images, frequency analysis can be applied on the SEM-images. In some embodiments, Fourier analysis may be used in the frequency analysis. In FIGS. 5A, 5B and 5C spatial frequency spectrums from Fast Fourier Transform (FFT) of the SEM-images in FIGS. 4A, 4B and 4C are illustrated.

The pattern of the spatial frequency spectrum is correlated to the spot size and spot shape of the electron beam. In FIGS. 5A, 5B and 5C, a white dotted line has been added for illustration purposes only. Thus, the spot size and spot shape of the electron beam can be derived from the spatial frequency spectrum and be compared with the corresponding reference data.

In case a difference between the electron beam calculated from one or more SEM-images and the reference data, with respect to at least one electron beam parameter, such as the spot size and/or spot shape, the electron beam can be adjusted based on such an identified difference between the electron beam when used on the powder layer and the reference data.

Figure 6:
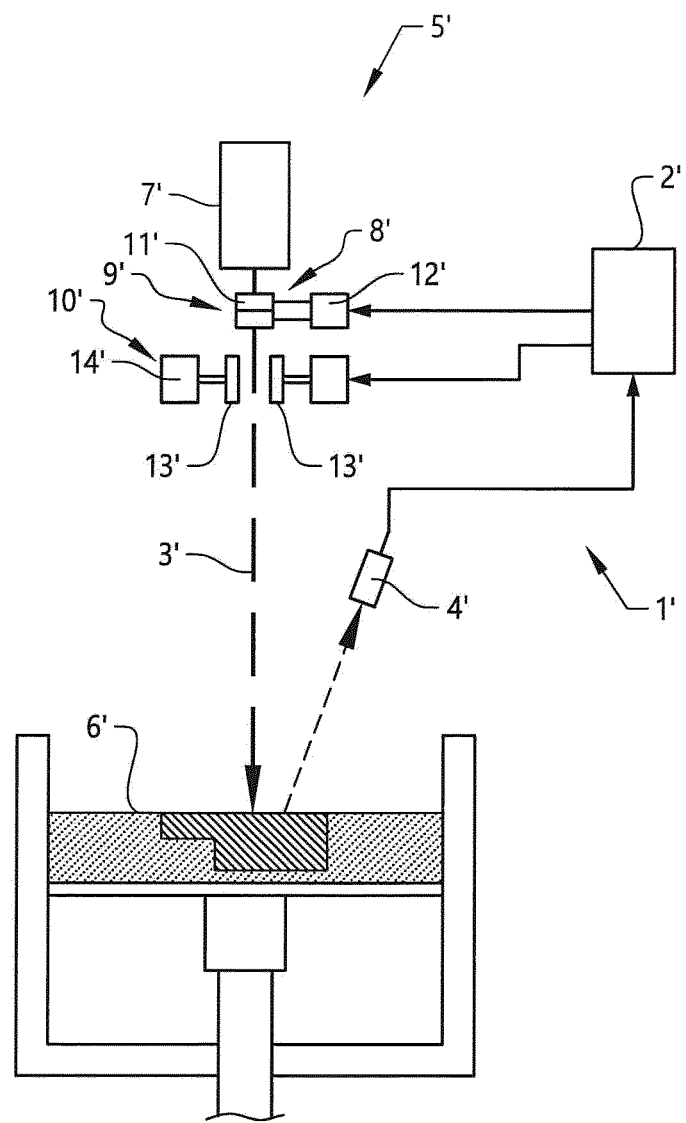
FIG. 6 is a schematic view of an AM machine using a laser beam.

In FIG. 6 a further example embodiment of an arrangement 1' for an AM machine is schematically illustrated. The arrangement 1' comprises a control unit 2' for controlling a laser beam 3', and a particle detector device 4' in form of a photon detector device. Further, a laser beam source 5' for providing the laser beam 3' is schematically illustrated. A powder layer 6' is radiated by the laser beam 3' and a set of images of the powder layer 6' is created for a set of positions on the powder layer 6' by detecting photons emitted or reflected from the radiated powder layer 6' by the photon detector device 4'.

The control unit 2' is configured to compare data representing the set of images and reference data with each other for identifying a difference between the laser beam when used on the powder layer and the reference data, with respect to at least one laser beam parameter, and to adjust the laser beam 3' based on such an identified difference between the laser beam when used on the powder layer and the reference data.

The laser beam source 5' can be designed in a way well known to the person skilled in the art. The laser beam source 5' may have a laser emitter 7' for emitting photons. These photons form the laser beam 3'. The laser beam source 5' has also focus units 8', stigmator units 9' and deflection units 10' for focusing and directing the laser beam 3' on various positions of the powder layer surface. The focus and stigmator units 8', 9' can comprise an actuator 11' and a driver 12' for adjustment of the actuator 11'. The focus and stigmator actuators are suitably lenses 11'. The deflection unit 10' can comprise a deflection actuator 13' and a deflection driver 14' for controlling the movement of the deflection actuator 13'. The deflection actuators are suitably mirrors 13'.

The focus units 8', stigmator units 9' and deflection units 10' are schematically illustrated in FIG. 6. The control unit 2' controls the laser beam by transmitting signals to the focus, stigmator and deflection drivers. Hereby, the laser beam 3' can be adjusted.

The detected photons can be reflected or backscattered photons originating from the laser beam. The photon detector device 4' may use any suitable equipment, such as for example photodiode, phototransistor, CCD, CMOS, PMT or similar. The photon detector device can generate data signals to be transmitted to the control unit. The data can be further processed and utilized for creating images for comparing with the reference data.

In another aspect, there is provided a program element configured and arranged when executed on a computer (e.g., via a computer program) to implement the methods and to configure the apparatuses described herein. The program element may be installed in a non-transitory computer readable storage medium. The computer readable storage medium may be the control unit described elsewhere herein or another control unit. The computer readable storage medium and the program element, which may comprise computer-readable program code portions embodied therein, may further be contained within a computer program product or a computer program, as described previously.

As mentioned, various embodiments of the present disclosure may be implemented in various ways, including as computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory VRAM, cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like, as have been described elsewhere herein. As such, embodiments of the present disclosure may take the form of an apparatus, system, computing device, computing entity, and/or the like executing instructions stored on a computer-readable storage medium to perform certain steps or operations. However, embodiments of the present disclosure may also take the form of an entirely hardware embodiment performing certain steps or operations.

Various embodiments are described below with reference to block diagrams and flowchart illustrations of apparatuses, methods, systems, and computer program products. It should be understood that each block of any of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, could be implemented by special purpose hardware-based computer systems that perform the specified functions or operations, or combinations of special purpose hardware and computer instructions.

Figure 7:
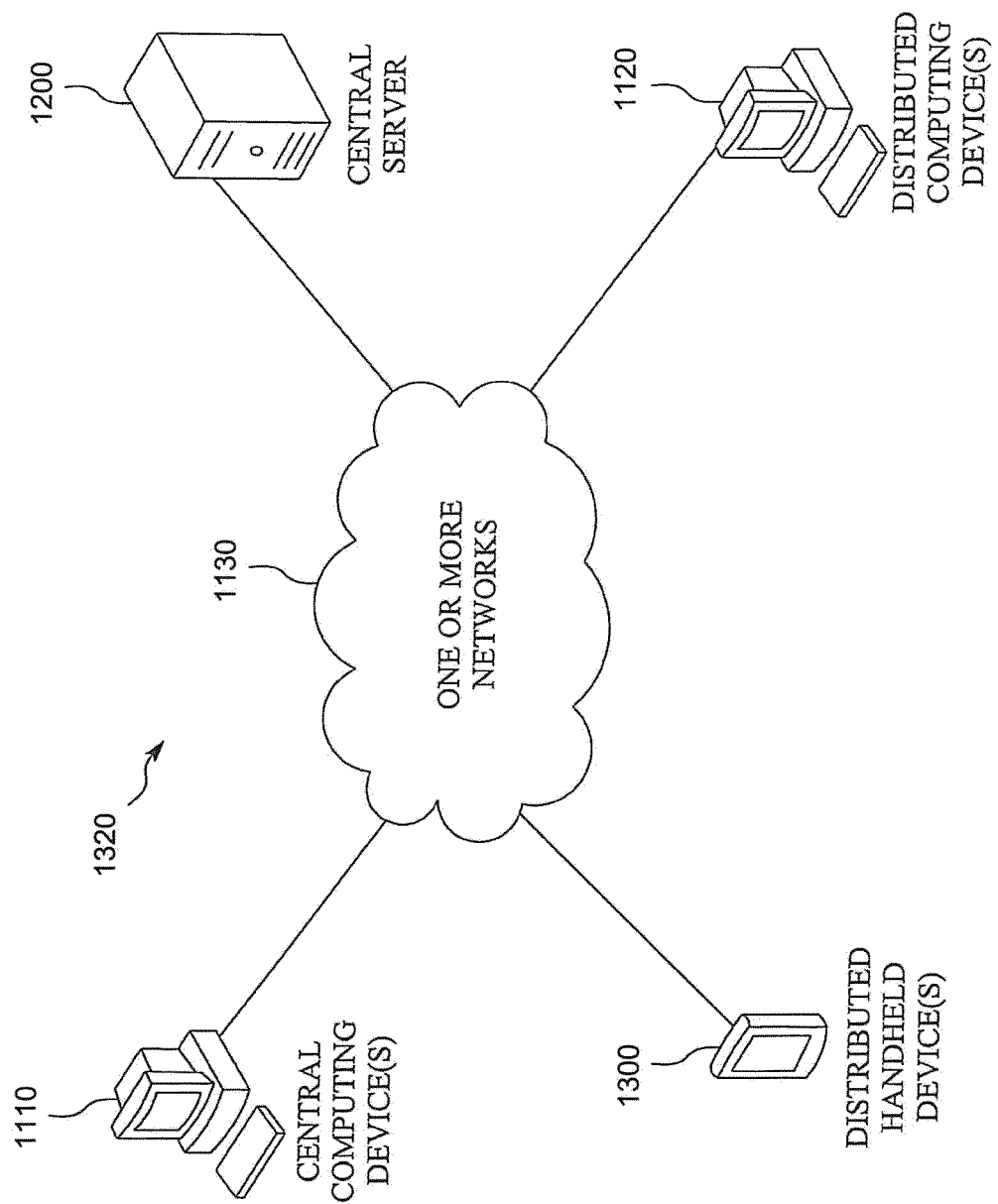
FIG. 7 is a block diagram of an exemplary system according to various embodiments.

FIG. 7 is a block diagram of an exemplary system 1320 that can be used in conjunction with various embodiments of the present disclosure. In at least the illustrated embodiment, the system 1320 may include one or more central computing devices 1110, one or more distributed computing devices 1120, and one or more distributed handheld or mobile devices 1300, all configured in communication with a central server 1200 (or control unit) via one or more networks 1130. While FIG. 7 illustrates the various system entities as separate, standalone entities, the various embodiments are not limited to this particular architecture.

According to various embodiments of the present disclosure, the one or more networks 1130 may be capable of supporting communication in accordance with any one or more of a number of second-generation (2G), 2.5G, third-generation (3G), and/or fourth-generation (4G) mobile communication protocols, or the like. More particularly, the one or more networks 130 may be capable of supporting communication in accordance with 2G wireless communication protocols IS-136 (TDMA), GSM, and IS-95 (CDMA). Also, for example, the one or more networks 1130 may be capable of supporting communication in accordance with 2.5G wireless communication protocols GPRS, Enhanced Data GSM Environment (EDGE), or the like. In addition, for example, the one or more networks 130 may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present disclosure, as should dual or higher mode mobile stations (e.g., digital/analog or TDMA/CDMA/analog phones). As yet another example, each of the components of the system 1320 may be configured to communicate with one another in accordance with techniques such as, for example, radio frequency (RF), Bluetooth™, infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), or the like.

Although the device(s) 1110-3100 are illustrated in FIG. 7 as communicating with one another over the same network 1130, these devices may likewise communicate over multiple, separate networks.

According to one embodiment, in addition to receiving data from the server 1200, the distributed devices 1110, 1120, and/or 1300 may be further configured to collect and transmit data on their own. In various embodiments, the devices 1110, 1120, and/or 1300 may be capable of receiving data via one or more input units or devices, such as a keypad, touchpad, barcode scanner, radio frequency identification (RFID) reader, interface card (e.g., modem, etc.) or receiver. The devices 1110, 1120, and/or 1300 may further be capable of storing data to one or more volatile or non-volatile memory modules, and outputting the data via one or more output units or devices, for example, by displaying data to the user operating the device, or by transmitting data, for example over the one or more networks 1130.

In various embodiments, the server 1200 includes various systems for performing one or more functions in accordance with various embodiments of the present disclosure, including those more particularly shown and described herein. It should be understood, however, that the server 1200 might include a variety of alternative devices for performing one or more like functions, without departing from the spirit and scope of the present disclosure. For example, at least a portion of the server 1200, in certain embodiments, may be located on the distributed device(s) 1110, 1120, and/or the handheld or mobile device(s) 1300, as may be desirable for particular applications. As will be described in further detail below, in at least one embodiment, the handheld or mobile device(s) 1300 may contain one or more mobile applications 1330 which may be configured so as to provide a user interface for communication with the server 1200, all as will be likewise described in further detail below.

Figure 8:
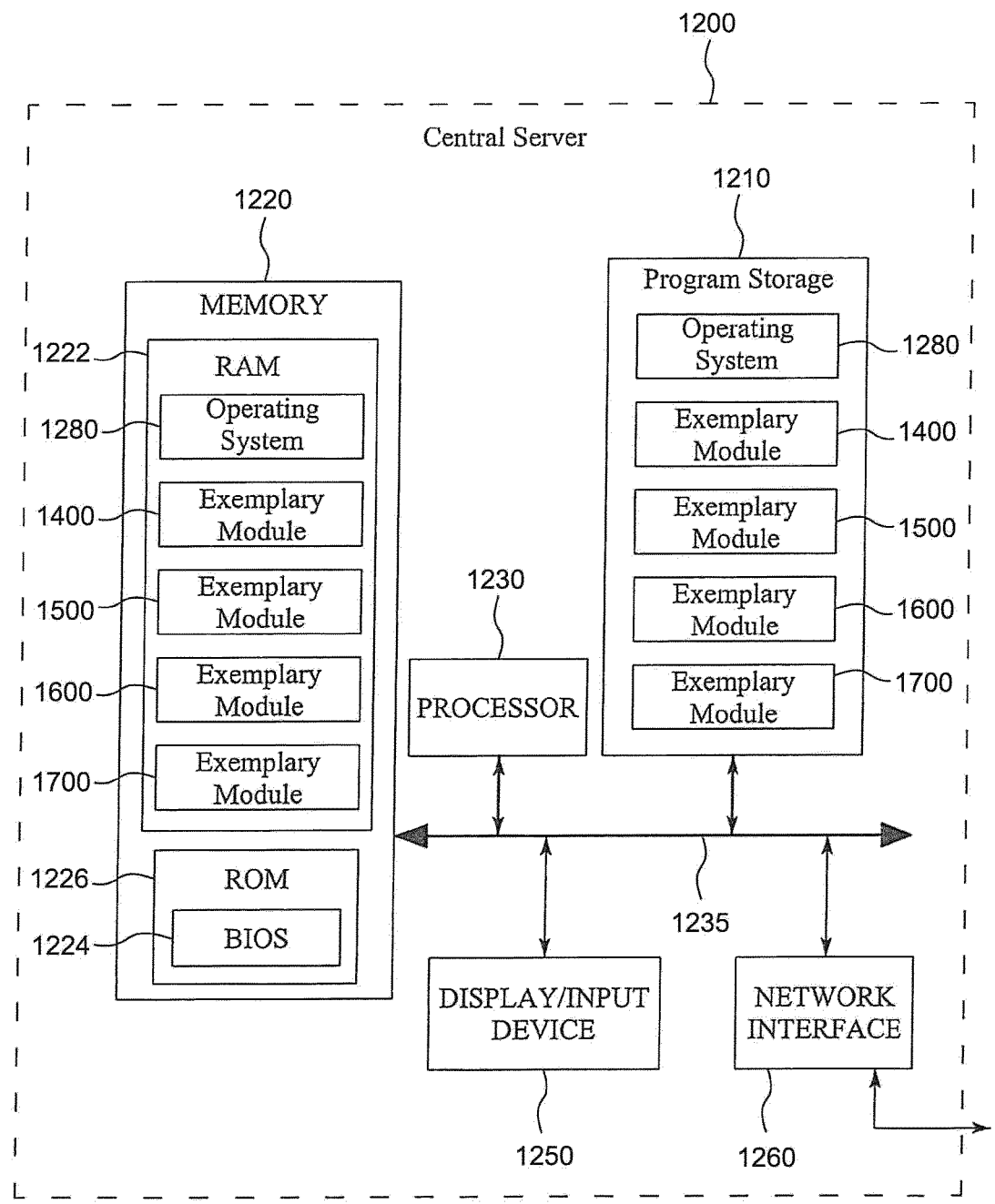
FIG. 8 is a schematic block diagram of an exemplary server according to various embodiments.

FIG. 8 is a schematic diagram of the server 1200 according to various embodiments. The server 1200 includes a processor 1230 that communicates with other elements within the server via a system interface or bus 1235. Also included in the server 1200 is a display/input device 1250 for receiving and displaying data. This display/input device 1250 may be, for example, a keyboard or pointing device that is used in combination with a monitor. The server 1200 further includes memory 1220, which typically includes both read only memory (ROM) 1226 and random access memory (RAM) 1222. The server's ROM 1226 is used to store a basic input/output system 1224 (BIOS), containing the basic routines that help to transfer information between elements within the server 1200. Various ROM and RAM configurations have been previously described herein.

In addition, the server 1200 includes at least one storage device or program storage 1210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 1210 are connected to the system bus 1235 by an appropriate interface. The storage devices 1210 and their associated computer-readable media provide nonvolatile storage for a personal computer. As will be appreciated by one of ordinary skill in the art, the computer-readable media described above could be replaced by any other type of computer-readable media known in the art. Such media include, for example, magnetic cassettes, flash memory cards, digital video disks, and Bernoulli cartridges.

Although not shown, according to an embodiment, the storage device 1210 and/or memory of the server 1200 may further provide the functions of a data storage device, which may store historical and/or current delivery data and delivery conditions that may be accessed by the server 1200. In this regard, the storage device 1210 may comprise one or more databases. The term "database" refers to a structured collection of records or data that is stored in a computer system, such as via a relational database, hierarchical database, or network database and as such, should not be construed in a limiting fashion.

A number of program modules (e.g., exemplary modules 1400-1700) comprising, for example, one or more computer-readable program code portions executable by the processor 1230, may be stored by the various storage devices 1210 and within RAM 1222. Such program modules may also include an operating system 1280. In these and other embodiments, the various modules 1400, 1500, 1600, 1700 control certain aspects of the operation of the server 1200 with the assistance of the processor 1230 and operating system 1280. In still other embodiments, it should be understood that one or more additional and/or alternative modules may also be provided, without departing from the scope and nature of the present disclosure.

In various embodiments, the program modules 1400, 1500, 1600, 1700 are executed by the server 1200 and are configured to generate one or more graphical user interfaces, reports, instructions, and/or notifications/alerts, all accessible and/or transmittable to various users of the system 1320. In certain embodiments, the user interfaces, reports, instructions, and/or notifications/alerts may be accessible via one or more networks 1130, which may include the Internet or other feasible communications network, as previously discussed.

In various embodiments, it should also be understood that one or more of the modules 1400, 1500, 1600, 1700 may be alternatively and/or additionally (e.g., in duplicate) stored locally on one or more of the devices 1110, 1120, and/or 1300 and may be executed by one or more processors of the same. According to various embodiments, the modules 1400, 1500, 1600, 1700 may send data to, receive data from, and utilize data contained in one or more databases, which may be comprised of one or more separate, linked and/or networked databases.

Also located within the server 1200 is a network interface 1260 for interfacing and communicating with other elements of the one or more networks 1130. It will be appreciated by one of ordinary skill in the art that one or more of the server 1200 components may be located geographically remotely from other server components. Furthermore, one or more of the server 1200 components may be combined, and/or additional components performing functions described herein may also be included in the server.

While the foregoing describes a single processor 1230, as one of ordinary skill in the art will recognize, the server 1200 may comprise multiple processors operating in conjunction with one another to perform the functionality described herein. In addition to the memory 1220, the processor 1230 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface, as will be described in further detail below. The user input interface, in turn, can comprise any of a number of devices allowing the entity to receive data from a user, such as a keypad, a touch display, a joystick or other input device.

Still further, while reference is made to the "server" 1200, as one of ordinary skill in the art will recognize, embodiments of the present disclosure are not limited to traditionally defined server architectures. Still further, the system of embodiments of the present disclosure is not limited to a single server, or similar network entity or mainframe computer system. Other similar architectures including one or more network entities operating in conjunction with one another to provide the functionality described herein may likewise be used without departing from the spirit and scope of embodiments of the present disclosure. For example, a mesh network of two or more personal computers (PCs), similar electronic devices, or handheld portable devices, collaborating with one another to provide the functionality described herein in association with the server 200 may likewise be used without departing from the spirit and scope of embodiments of the present disclosure.

According to various embodiments, many individual steps of a process may or may not be carried out utilizing the computer systems and/or servers described herein, and the degree of computer implementation may vary, as may be desirable and/or beneficial for one or more particular applications.

Figure 9:
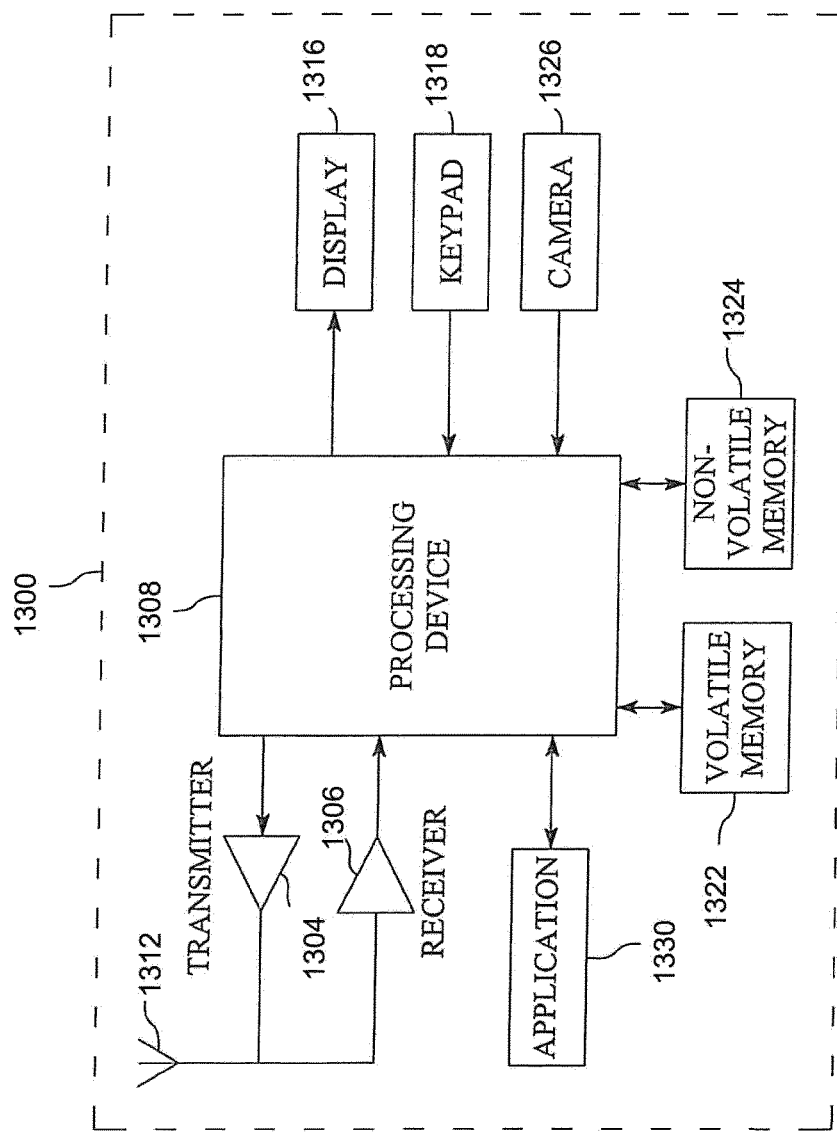
FIG. 9 is a schematic block diagram of an exemplary mobile device according to various embodiments.

FIG. 9 provides an illustrative schematic representative of a mobile device 1300 that can be used in conjunction with various embodiments of the present disclosure. Mobile devices 1300 can be operated by various parties. As shown in FIG. 9, a mobile device 1300 may include an antenna 1312, a transmitter 1304 (e.g., radio), a receiver 1306 (e.g., radio), and a processing element 1308 that provides signals to and receives signals from the transmitter 1304 and receiver 1306, respectively.

The signals provided to and received from the transmitter 1304 and the receiver 1306, respectively, may include signaling data in accordance with an air interface standard of applicable wireless systems to communicate with various entities, such as the server 1200, the distributed devices 1110, 1120, and/or the like. In this regard, the mobile device 1300 may be capable of operating with one or more air interface standards, communication protocols, modulation types, and access types. More particularly, the mobile device 1300 may operate in accordance with any of a number of wireless communication standards and protocols. In a particular embodiment, the mobile device 1300 may operate in accordance with multiple wireless communication standards and protocols, such as GPRS, UMTS, CDMA2000, 1xRTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile device 1300 may according to various embodiments communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The mobile device 300 can also download changes, add-ons, and updates, for instance, to its firmware, software (e.g., including executable instructions, applications, program modules), and operating system.

According to one embodiment, the mobile device 1300 may include a location determining device and/or functionality. For example, the mobile device 1300 may include a GPS module adapted to acquire, for example, latitude, longitude, altitude, geocode, course, and/or speed data. In one embodiment, the GPS module acquires data, sometimes known as ephemeris data, by identifying the number of satellites in view and the relative positions of those satellites.

The mobile device 1300 may also comprise a user interface (that can include a display 1316 coupled to a processing element 1308) and/or a user input interface (coupled to a processing element 1308). The user input interface can comprise any of a number of devices allowing the mobile device 300 to receive data, such as a keypad 1318 (hard or soft), a touch display, voice or motion interfaces, or other input device. In embodiments including a keypad 1318, the keypad can include (or cause display of) the conventional numeric (0-9) and related keys (#, *), and other keys used for operating the mobile device 1300 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile device 1300 can also include volatile storage or memory 1322 and/or non-volatile storage or memory 1324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database mapping systems, data, applications, programs, program modules, scripts, source code, object code, byte code, compiled code, interpreted code, machine code, executable instructions, and/or the like to implement the functions of the mobile device 1300.

The mobile device 1300 may also include one or more of a camera 1326 and a mobile application 1330. The camera 1326 may be configured according to various embodiments as an additional and/or alternative data collection feature, whereby one or more items may be read, stored, and/or transmitted by the mobile device 1300 via the camera. The mobile application 1330 may further provide a feature via which various tasks may be performed with the mobile device 1300. Various configurations may be provided, as may be desirable for one or more users of the mobile device 1300 and the system 1320 as a whole.

It is to be understood that the present disclosure is not limited to the embodiments described above and illustrated in the drawings; rather, the skilled person will recognize that many changes and modifications may be made within the scope of the appended claims.

The invention claimed is:

1. A method for controlling an energy beam in an additive manufacturing machine when forming a three-dimensional article layer by layer by successive fusion of selected areas of powder layers, which selected areas correspond to successive layers of the three-dimensional article, the method comprising the steps of:
    radiating a reference powder layer by the energy beam before melting the reference powder layer for forming the three-dimensional article;
    creating a set of reference images of the reference powder layer for a set of positions on the reference powder layer by detecting particles emitted, backscattered, or reflected from the reference powder layer when being radiated;
    radiating a powder layer by the energy beam;
    creating a set of images of the powder layer for a set of positions on the powder layer by detecting particles emitted, backscattered, or reflected from the powder layer when being radiated;
    creating data representing the set of images by means of frequency analysis applied on the set of images;
    obtaining a spot size and a shape of the energy beam from the frequency analysis;
    comparing the data representing the set of images and reference data with each other for identifying a difference between the energy beam when used on the powder layer and the reference data, with respect to at least one energy parameter, the reference data representing the set of reference images; and
    adjusting the energy beam based on such an identified difference between the energy beam when used on the powder layer and the reference data.

2. The method of claim 1, further comprising selecting the set of positions on the powder layer and the set of positions on the reference powder layer such that they have same coordinates in a coordinate system of the additive manufacturing machine.

3. The method of claim 1, further comprising creating the set of reference images after calibration of the energy beam has been performed.

4. The method of claim 1, further comprising creating the set of reference images before starting to melt the reference_powder layer for forming the three-dimensional article.

5. The method of claim 1, further comprising creating the set of reference images while moving the energy beam for pre-heating the reference powder layer.

6. The method of claim 1, further comprising creating the set of reference images after raking of the reference powder layer.

7. The method of claim 1, further comprising adjusting the energy beam based on an identified difference of the spot size of the energy beam between the energy beam when used on the powder layer and the reference data.

8. The method of claim 1, further comprising adjusting the energy beam based on an identified difference of the shape of the energy beam between the energy beam when used on the powder layer and the reference data.

9. The method of claim 1, further comprising comparing the data representing the set of images and the reference data with each other with respect to focus.

10. The method of claim 1, further comprising comparing the data representing the set of images and the reference data with each other with respect to astigmatism.

11. The method of claim 1, further comprising creating the set of images while moving the energy beam for pre-heating the powder layer.

12. The method of claim 1, further comprising creating the set of images after raking of the powder layer.

13. The method of claim 1, further comprising using an electron beam as the energy beam.

14. The method of claim 13, further comprising creating the set of images by detecting x-rays.

15. The method of claim 13, further comprising creating the set of images by detecting back-scattered electrons.

16. The method of claim 13, further comprising creating the set of images by detecting secondary electrons.

17. An arrangement for an additive manufacturing machine, the arrangement comprising:
   a particle detector device for detecting particles emitted, backscattered, or reflected from a reference powder layer and a powder layer in the additive manufacturing machine; and
   a control unit configured to:
      manipulate an energy beam for radiating the reference powder layer before melting the reference powder;
      create a set of reference images of the reference powder layer for a set of positions on the reference powder layer by detecting particles emitted, backscattered, or reflected from the reference powder layer when being radiated;
      manipulate the energy beam for radiating the powder layer;
      create a set of images of the powder layer for a set of positions on the powder layer by detecting particles emitted, backscattered, or reflected from the powder layer when radiated;
      create data representing the set of images by means of frequency analysis applied on the set of images;
      obtain a spot size and a shape of the energy beam from the frequency analysis;
      compare the data representing the set of images and reference data with each other for identifying a difference between the energy beam when used on the powder layer and the reference data, with respect to at least one energy beam parameter, the reference data representing the set of reference images; and
      adjust the energy beam on such an identified difference between the energy beam when used on the powder layer.

18. A computer program product comprising at least one non-transitory computer-readable storage medium having computer-readable program code portions embodied therein, the computer-readable program code portions comprising at least one executable portion configured for:
   manipulating an energy beam for radiating a reference powder layer before melting the reference powder layer;
   creating a set of reference images of the reference powder layer for a set of positions on the reference powder layer by detecting particles emitted, backscattered, or reflected from the reference powder layer when being radiated;
   manipulating the energy beam for radiating a powder layer;
   creating a set of images of the powder layer for a set of positions on the powder layer upon detection of particles emitted, backscattered, or reflected from the powder layer when being radiated;
   creating data representing the set of images by means of frequency analysis applied on the set of images;
   obtaining a spot size and a shape of the energy beam from the frequency analysis;
   comparing the data representing the set of images and reference data with each other for identifying a difference between the energy beam when used on the powder layer and the reference data, with respect to at least one energy beam parameter, the reference data representing the set of reference images; and
   adjusting the energy beam based on such an identified difference between the energy beam when used on the powder layer and the reference data.

19. The method of claim 10, further comprising adjusting the energy beam based on such an identified difference between the energy beam when used on the powder layer, the reference data, and an astigmatism comparison.

* * * * *